United States Patent [19]

Yamada

[11] Patent Number: 4,636,899
[45] Date of Patent: Jan. 13, 1987

[54] METHOD AND MAGNETIC HEAD ASSEMBLY FOR RECORDING AND REPRODUCING CONTROL SIGNALS

[75] Inventor: Fumiaki Yamada, Tokyo, Japan

[73] Assignee: Nakamichi Corporation, Kodaira, Japan

[21] Appl. No.: 506,575

[22] Filed: Jun. 22, 1983

[30] Foreign Application Priority Data

Aug. 6, 1982 [JP] Japan .............................. 57-136998
Aug. 11, 1982 [JP] Japan .............................. 57-139591
Aug. 11, 1982 [JP] Japan .............................. 57-139592

[51] Int. Cl.$^4$ .............................................. G11B 5/20
[52] U.S. Cl. ...................................... 360/123; 360/125
[58] Field of Search .................... 360/123, 125, 115

[56] References Cited

U.S. PATENT DOCUMENTS 4,369,476  1/1983  Karsh .............................. 360/123

FOREIGN PATENT DOCUMENTS 1048710  7/1956  Fed. Rep. of Germany ...... 360/123
547821  5/1977  U.S.S.R. .............................. 360/123
570090  8/1977  U.S.S.R. .............................. 360/123

Primary Examiner—John H. Wolff
Assistant Examiner—Matthew J. Bussan
Attorney, Agent, or Firm—Flynn, Thiel, Boutell & Tanis

[57] ABSTRACT

Method and magnetic head assembly for recording and reproducing control signals in which the control signals are recorded in a control track between information tracks of a magnetic recording medium and are reproduced therefrom, said control signals being recorded with the magnetizing direction perpendicular to that of the information signals recorded in the information tracks in the same plane. Components of the control signals parallel to the magnetization direction of the information signals are detected by the magnetic head assembly in order to reproduce the control signals.

7 Claims, 5 Drawing Figures

METHOD AND MAGNETIC HEAD ASSEMBLY FOR RECORDING AND REPRODUCING CONTROL SIGNALS

BACKGROUND OF THE INVENTION

This invention relates to a method and a magnetic head assembly for magnetically recording control signals in a control track between information tracks and reproducing therefrom.

For example, in reproduction of sound using audio magnetic tape recorders, for positioning for reproduction one selected piece of music among a plurality of pieces of music recorded in stereo audio tracks, heretofore there has been proposed a method according to which coded control signals are recorded in each blank portion between pieces of music recorded in the audio tracks. However, this method has a disadvantage that if the blank portion is short, control signals cannot be written therein, and that when the written control signal should be rewritten, it is feared that audio signals adjacent to the control signal will simultaneously be erased. There has been proposed also another method according to which control signals are recorded in a control track between two audio tracks. However, this method has also a disadvantage that this conventional method requires an exclusive recording and/or reproducing head for recording and/or reproducing the control signals. Particularly in a cassette tape recorder, application of this method is restricted because of head arrangement and it cannot be utilized in practice.

OBJECTS OF THE INVENTION

An object of this invention is to eliminate these disadvantages of the prior art techniques.

Another object of this invention is to provide a method and a magnetic head assembly for magnetic recording and reproduction of control signals in which the control signals are rewritable.

Still another object of this invention is to provide a method and a magnetic head assembly for magnetic recording and reproduction of control signals in which a magnetic head used exclusively for recording and reproducing the control signals is not needed.

Still another object of this invention is to provide a method and a magnetic head assembly for magnetic recording and reproduction of control signals in which the control signals are recorded in a control track between the information tracks and reproduced therefrom, and in which a magnetic head used for recording and reproducing the information signals is used also for recording and reproducing the control signals.

SUMMARY OF THE INVENTION

In order to achieve the above-mentioned objects, this invention is characterized in that, control signals are magnetically recorded in a control track between information tracks of a magnetic recording medium so that a magnetized direction of said control signals is perpendicular to that of the information signals recorded in said information tracks in the same plane.

Furtheremore, according to this invention said control signals recorded in said control track are magnetically reproduced by detecting components parallel to the magnetized direction of said information signals among the magnetic field components of said recorded control signals.

Still further, according to this invention, to record control signals in a control track between information tracks of a magnetic recording medium as described above, there is provided a magnetic head assembly comprising: cores having working gaps to record information signals in said information tracks with a magnetizing direction parallel to the moving direction of said magnetic recording medium, and spacer means interposed between said cores to be related to said control track, wherein said cores are magnetized with polarities opposite to each other in recording said control signals whereby said control signals are recorded in said control track with a magnetized direction perpendicular to that of said information signals in the same plane.

DETAILED DESCRIPTION OF A PREFERRED EMBODIMENT

Figure 1:
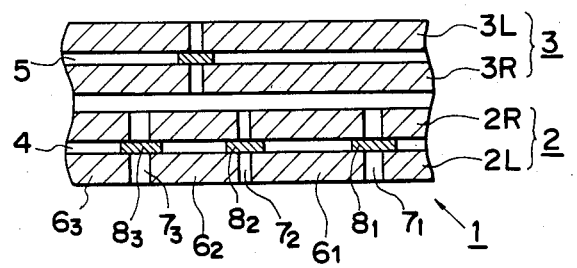
FIG. 1 is a plan view of information tracks and blank tracks of a magnetic cassette tape.

FIGS. 1 to 4 show an embodiment of this invention for recording and reproducing control signals for positioning audio signals in the case where stereo audio signals are recorded in a cassette tape. In the figures, 1 designates a magnetic cassette tape having four tracks for a cassette tape recorder.

In the lower half of the magnetic tape 1 is disposed the forward direction audio track 2 and in the upper half thereof is disposed the reverse direction audio track 3. Each of the forward and reverse direction audio tracks 2 and 3 consists of a left channel audio track 2L, 3L and a right channel audio track 2R, 3R. Between these pairs of audio tracks 2L and 2R, 3L and 3R are disposed blank tracks to prevent crosstalk between them. In this embodiment, in order that the two blank tracks between the left and right channels, respectively, of the two tracks 2 and 3 are used as control tracks 4 and 5, the control signals for positioning audio signals are recorded in these control tracks 4 and 5.

Hereinbelow, the method for recording and reproduction will be explained in detail with respect to the forward direction audio track 2. In the left and right channel audio tracks 2L and 2R audio signals $6_1, 6_2, \ldots$, such as pieces of music, are recorded with a magnetizing direction parallel to the moving direction of the magnetic tape 1. Control signals $8_1, 8_2, \ldots$, having a magnetizing direction perpendicular to that of the audio signals $6_1, 6_2, \ldots$ are recorded in the control track 4 at the positions corresponding to the blank portions in front of these audio signals $6_1, 6_2, \ldots$.

Recording and reproduction of such control signals $8_1, 8_2, \ldots$ are effected by using a magnetic head assembly for recording and or reproducing the audio signals $6_1, 6_2, \ldots$.

Figure 2:
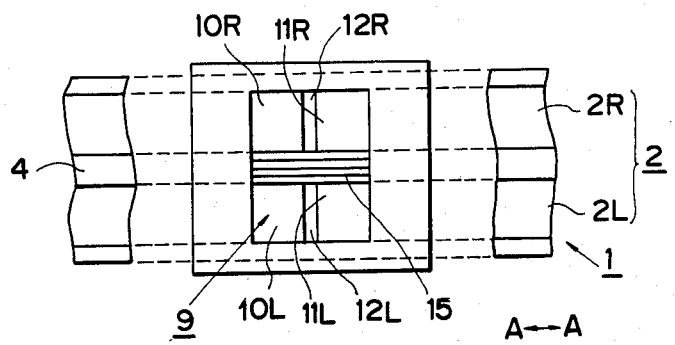
FIG. 2 is a plan view showing the geometrical relationship between a magnetic head assembly of this invention and the tracks.
Figure 3A:
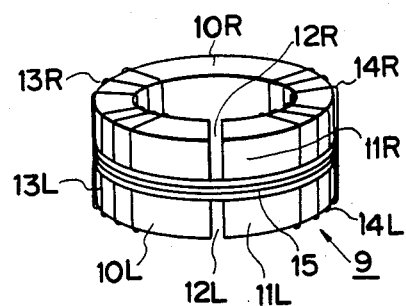
FIG. 3A is a perspective view of the magnetic head assembly of FIG. 2.

A magnetic head assembly 9 is an exaple of a reproducing head for the audio signals $6_1, 6_2, \ldots$. As shown in FIGS. 2 and 3, working gaps 12L and 12R are formed along the direction perpendicular to the moving direction A—A of the magnetic tape 1 in the front 11L and 11R of the left channel core 10L and right channel core 10R corresponding to the left and right channel audio tracks 2L and 2R, respectively. Coils 13L, 14L and 13R, 14R are wound on the cores 10L and 10R, respectively, in a balancing manner.

Figure 4:
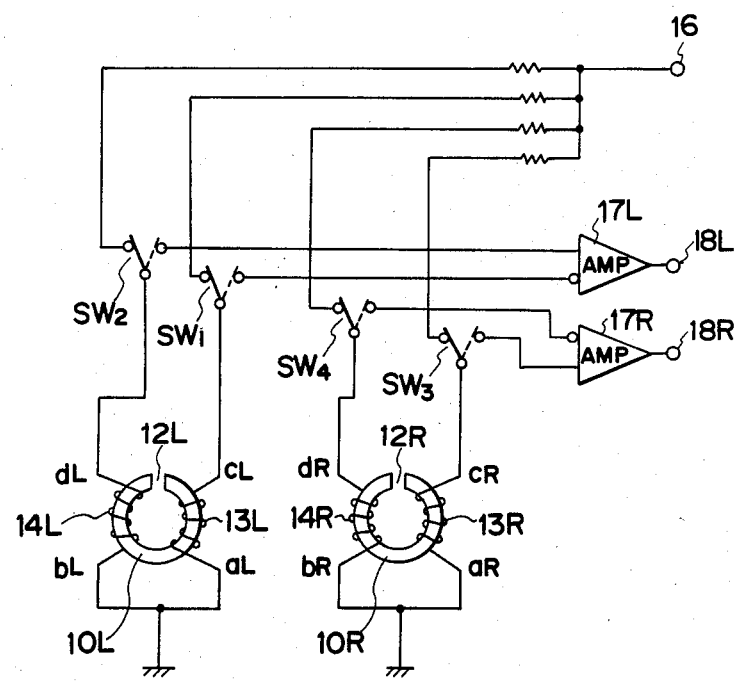
FIG. 4 represents a circuit diagram of a device according to this invention.

15 denotes a spacer composed of non-magnetic layers between the cores 10L and 10R, which is used as working gap for recording the control signals $8_1$, $8_2$, ... during recording of the control signals $8_1$, $8_2$, .... As shown in FIG. 4 for the left channel core 10L the coils 13L and 14L are wound counter-clockwise as viewed from the side of the working gap 12L. Corresponding one ends of them aL, bL are connected with each other and to the earth. On the other hand, the other ends cL, dL are connected with the movable contact of the switches $SW_1$ and $SW_2$, respectively. One fixed contact of the switches $SW_1$ and $SW_2$ is connected with the input terminal 16, to which are applied control signals coded by using sinewave signals e.g. of 5 Hz just as for the prior art techniques. The other fixed contact of the switches $SW_1$ and $SW_2$ is connected with the (−) input terminal and the (+) input terminal of a differential amplifier 17L, respectively. For the right channel core 10R the coils 13R and 14R are wound clockwise as viewed from the side of the working gap 12R. Corresponding one end of them aR, bR are connected with each other and to the earth. On the other hand, the other ends cR, dR are connected with the movable contact of the switches $SW_3$ and $SW_4$, respectively. One fixed contact of the switches $SW_3$ and $SW_4$ is connected to the input terminal 16, and the other fixed contact of the switches $SW_3$ and $SW_4$ is connected with the (+) input terminal and the (−) input terminal of a differential amplifier 17R, respectively.

18L and 18R denote the output terminal for the left and right channel, respectively.

Figure 3B:
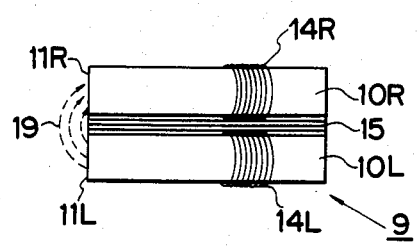
FIG. 3B is a side view of the magnetic head assembly of FIG. 2.

For the magnetic head assembly 9 thus constructed the switches $SW_1$ to $SW_4$ are, during the recording of the control signals $8_1$, $8_2$, ..., connected as shown by full lines in FIG. 4. When the coded control signals are supplied with a given bias current from the input terminal 16, magnetic poles having polarities opposite to each other are formed alternatively at the front faces 11L and 11R of the left and right channel cores 10L and 10R in response to 1 cycle of a sinewave signal corresponding to e.g. the code "1" of the control signal. Since the magnetic field 19 is generated along the direction perpendicular to the moving direction A—A of the magnetic tape 1 as one of its states, as shown in FIG. 3B, control signals $8_1$, $8_2$, ... are recorded with the magnetizing direction perpendicular to the magnetizing direction of the audio signals $6_1$, $6_2$, ... in a control track 4 of the magnetic tape 1. Recording of the audio signals is effected in the same manner as for the prior art techniques.

For reproduction of the control signals $8_1$, $8_2$, ... thus recorded, the switches $SW_1$ to $SW_4$ are connected as shown by broken lines in FIG. 4 and the magnetic head 9 serves as a usual reproducing head. That is, in the tape fast movement mode with a tape speed higher than the normal reproduction speed, for positioning audio signals $6_1$, $6_2$, ... the magnetic head assembly 9 detects a magnetic field component of the control signals parallel to the magnetized direction of the audio signals $6_1$, $6_2$, ... by using the working gaps 12L and 12R of the left and right channel cores 10L and 10R. The signals detected by the left channel core 10L are taken out through the differential amplifier 17L from the output terminal 18L and the signals detected by the right channel core 10R are taken out through the differential amplifier 17R from the output terminal 18R. These signals are subtracted to each other and thereafter the code contents are read by a well-known technique.

Once a desired head position of one stereo audio signal is detected among a plurality of stereo audio signals by using a positioning control signal, the magnetic tape 1 is moved with the normal reproduction speed in a well-known manner. The magnetic head assembly 9 reproduces the selected stereo audio signals recorded in the left and right audio tracks 2L and 2R with the magnetizing direction parallel to the moving direction A—A of the tape and the reproduced stereo audio signals are taken out from the output terminals 18L and 18R. Since the control signals and the audio signal have different frequencies, in order to take out only the control signals in the positioning mode and only audio signal components in the normal reproduction mode, given filter circuits (not shown) are disposed in the reproduction circuit, which circuit is connected to said output terminals 18L and 18R.

For erasing the control signals the switches $SW_1$ to $SW_4$ are connected as shown by the full lines in FIG. 4 just as for recording, a given erase current is supplied through the input terminals 16.

The control signals recorded and reproduced according to the invention are not limited to the positioning control signals described in the above-described embodiment, but can be mode commuting signals in magnetic recording and reproducing control signals, where commutation of playback EQ, noise-reduction, etc. is automatically performed by coded signals recorded in the magnetic tape.

Since, according to this invention, the recording and/or reproducing head for information signals is used also for recording and reproducing of the control signals and furthermore the control signals are located in the blank track between the information tracks, the practical value of the invention is extremely high.

Furthermore, contrary to the prior art technique wherein the control signals are recorded with reverse phase to each other in both the left and right channel information tracks so that the distinction between reproduced control signals and reproduced information signals can be made by obtaining the reproduced control signals having reverse phase to each other from the left and right channels, according to the invention, another advantage can be obtained that, by recording channel control signals in only one control track, two reproduced control signals having reverse phase to each other can be obtained.

What is claimed:

1. A magnetic head assembly for recording a control signal in a control track between information tracks of a magnetic recording medium and reproducing therefrom, comprising:
    cores having respective working gaps to record information signals in said information tracks with a magnetizing direction parallel to the moving direction of said magnetic recording medium and to reproduce therefrom, each core having a right-hand portion and a left-hand portion;
    respective coils wound on said cores, the winding direction of a said coil on one core being counter to the winding direction of a said coil on another core, said coils each having right-hand and left-hand portions respectively corresponding to said right-hand and left-hand portions of the corresponding core;

spacer means interposed between said cores for opposition to said control track;

means responsive to the control signal for magnetizing said cores with polarities opposite to each other and therewith for recording said control signal in said control track with a magnetized direction perpendicular to that of said information signal, said means for magnetizing including means for supplying drive currents, corresponding to the control signal to be recorded, to said coils in a manner that current directions in left-hand and right-hand portions of each coil are opposite to each other and therewith current directions around said left-hand and right-hand portions of each core are opposite to each other;

means for reproducing a control signal for magnetic field components parallel to the magnetizing direction of said information signals among magnetic field components formed by said recorded control signal, said reproducing means including said working gaps and further including means connecting the left-hand and right-hand portions of a said coil for current flow in the same direction therethrough and therewith for picking up a signal across said coil generated by the corresponding working gap.

2. A magnetic head assembly as claimed in claim 1, in which the control track is a blank track located between information tracks in which stereo audio signals are recorded.

3. A magnetic head assembly as claimed in claim 1, in which the control signals are coded signals for positioning of information signals recorded in the information tracks.

4. The apparatus of claim 1, including means obtaining opposite phase picked-up signals from two said coils, whereby the last mentioned picked-up signals may be subtracted to obtained a higher amplitude signal output.

5. The apparatus of claim 4 in which said obtaining means comprises amplifiers, each coil being connected across a pair of inputs of a respective amplifier, an inverting input of one amplifier being connected to one end of one coil, an inverting input of another amplifier being connected to the opposite end of another coil, the outputs of said amplifiers being of opposite phase, suitable for doubling output amplitude by subtraction of said out of phase output signals.

6. The apparatus of claim 1 in which each coil has a pair of free ends, said drive current supplying means comprising a center tap on each coil connected to circuit neutral and a switchable path for connecting both free ends of each coil to said control signal to be recorded, so that the working gap of each core is magnetized with a polarity opposite the polarity of the part of the core located opposite to said working gap, the instantaneous magnetic polarity of the working gaps of two cores opposed across said spacer means being opposite.

7. The apparatus of claim 1 in which on each core the respective coil is wound in the same direction from the end of the core at one side of the working gap to the end of the core at the other side of the working gap, the coil having a tap in the center portion thereof, such that current flow from the coil ends to the tap polarizes the working gap portion of the core differently than the central portion of the core remote from the working gap, and such that opposite sides of the working gap are polarized differently by signals recorded on the tap with a magnetizing direction parallel to the direction of tape travel.

* * * * *